(No Model.)  2 Sheets—Sheet 1.
J. L. HARDIE.
CAR TRUCK.
No. 517,571. Patented Apr. 3, 1894.
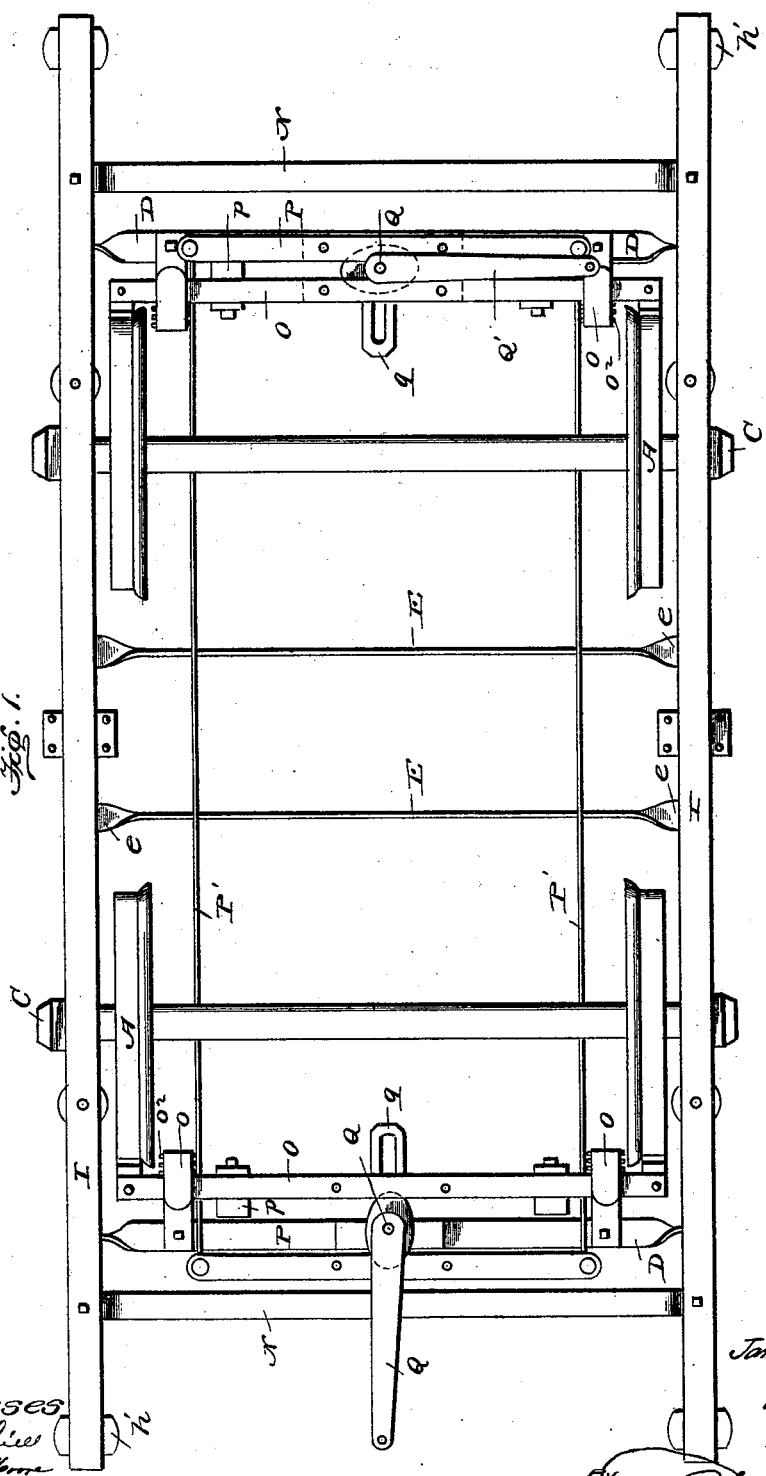
Witnesses
Wm B. Dashiell
Mary E. Moore
James L. Hardie
Inventor
By Wm. F. Moore,
Atty.
THE NATIONAL LITHOGRAPHING COMPANY,
WASHINGTON, D. C.

(No Model.) 2 Sheets—Sheet 2.
J. L. HARDIE.
CAR TRUCK.
No. 517,571. Patented Apr. 3, 1894.
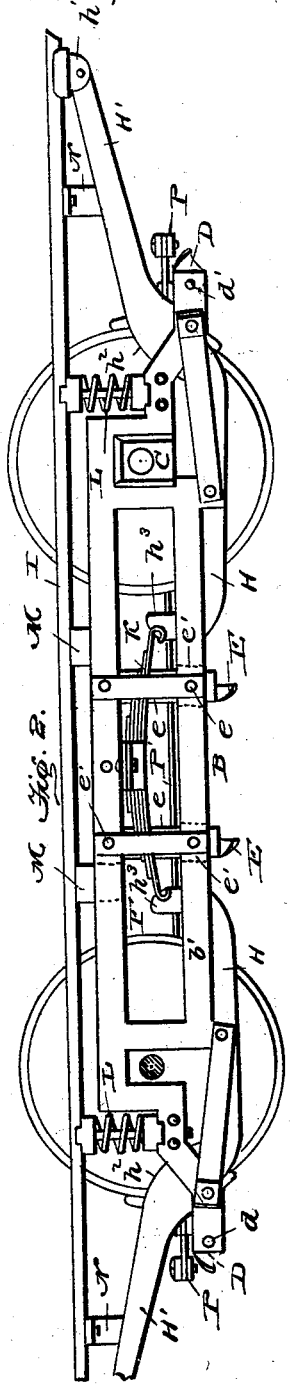
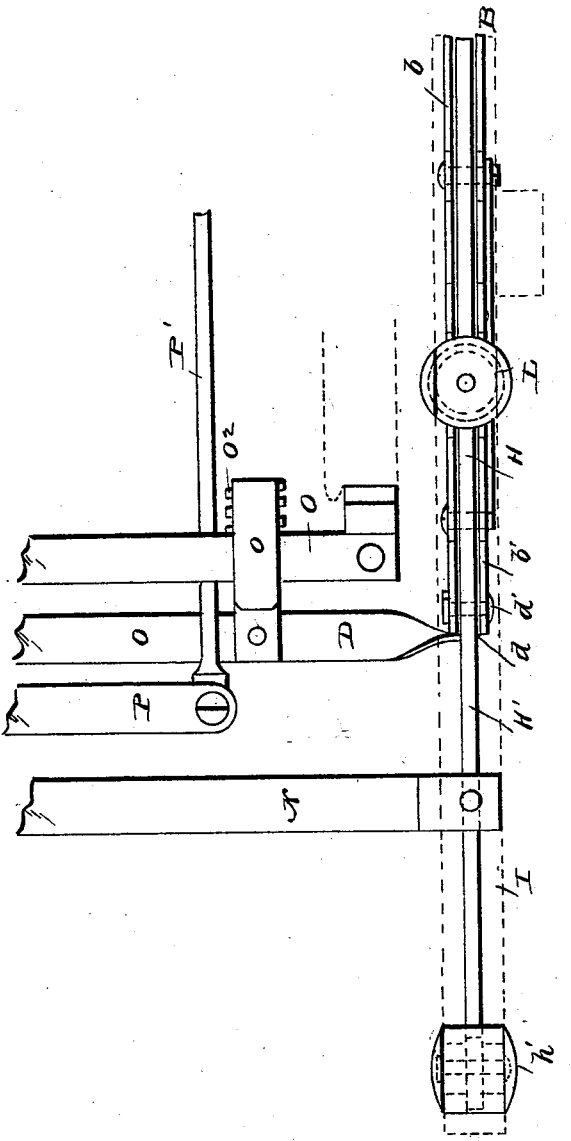
Witnesses:
Wm C Dashiell
May E Moore
James L. Hardie
Inventor
By Wm N Moore
Attys.

UNITED STATES PATENT OFFICE.

JAMES L. HARDIE, OF CHESTER, PENNSYLVANIA, ASSIGNOR OF ONE-HALF TO JOHN J. LEARY, OF SAME PLACE.

CAR-TRUCK.

SPECIFICATION forming part of Letters Patent No. 517,571, dated April 3, 1894.

Application filed May 16, 1893. Serial No. 474,392. (No model.)

*To all whom it may concern:*

Be it known that I, JAMES L. HARDIE, a citizen of the United States, residing at Chester, in the county of Delaware and State of Pennsylvania, have invented certain new and useful Improvements in Car-Trucks; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention is an improvement in car trucks designed more especially for electric cars, but applicable also to street cars of any form.

The object of the invention is to provide a car truck in which spring support may be given to the extreme ends of the sills instead of having them supported directly upon springs located centrally of the truck. I have also aimed to provide a truck containing in addition to the improved spring supports, an improved form of brake mechanism of simple, durable, and effective construction.

To these ends the invention consists primarily of a car truck provided with suitable springs with connections from the springs to the ends of the sills for supporting the sills from the extreme ends thereof.

The invention further consists of a truck having springs arranged centrally in the frame thereof, with levers pivoted in said frame having their inner ends connected to the springs and their outer ends supporting the sills.

The invention also includes the details of construction and the particular form of brake mechanism hereinafter described and particularly pointed out in the claims and illustrated in the accompanying drawings, in which—

Figure 1 is a side elevation of my improved truck. Fig. 2 is a plan view of the same. Fig. 3 is a detailed view showing a portion of one of the sides with the sill removed to illustrate the construction of the frame.

In these figures A, A, represent the wheels of a truck, and B, the side bars of the frame or running gear which are provided with vertical chambers or guide-ways in which are located the axle boxes C having sliding movement therein. The side bars are formed of an inner section $b$, and an outer section $b'$, each section being preferably made in one piece out of forged iron. The side bars B are connected together at each end by the cross bars D, which have their ends bent at right angles as shown at $d$, to enable them to enter the space between the sections $b$, and $b'$, to which they are secured by means of bolts $d'$ passing through the sections and through the ends of the cross bars. The side bars are also connected between the wheels of the truck by cross bars E, which have their ends bent upwardly at right angles to the main portion as at $e$, to which they are connected by bolts $e'$, suitable blocks $e^2$, being interposed between the sections to provide an intermediate support. It will be observed that an elongated opening or space is formed in the side bar as at F, and the angular extensions $e$, of the cross bars E, serve to strengthen the portions of the bars B, above and below this space. At each end of the truck it will be observed that the side bars are depressed slightly as at G, so that the portion or end to which cross bars D are secured are below the level of the axles. Between the sections of the side bars at this depressed portion are pivoted what I term the extension levers, H, which, as will be observed, have an upwardly inclined portion H' terminating beneath the end of the sill I, of the car or truck, to which it is connected by a suitable rocker $h'$. The remaining portion of the extension levers extend down at a sharp angle as at $h^2$ and thence horizontally toward the center of the truck where they terminate in a slight upward extension $h^3$, and these extensions are secured to a suitable spring located in the space F, which tends to keep the inner ends forced normally down, and the outer ends of the levers raised, thus exerting an upward pressure on the ends of the sills. I prefer to use the form of spring shown in the drawings at K, which has its central portion secured to the under side of the upper portion of the side bar, and its ends connected with the inner ends of the extension levers. It will thus be seen that the sills are supported from their ends, and while an easy vertical yielding movement is provided to take up any shocks or jars, all undue rocking of the car is prevented which is so great an objection where the sills are directly supported upon springs located approximately centrally of the truck. If necessary additional support may be provided for the sills by means of the coiled springs L, resting upon ledges $l$, of the frame. The sills are guided further in their vertical movement by guiding blocks or projections M, extending downwardly from the under side of the sills into the space between the sections of the side bars, and the sills may also be connected by the cross rods N, if the sills form a part of the truck.

My improved brake comprises the brake bars O, which are provided upon their outer ends with brake blocks of the ordinary form, and which are supported in the guideways $o$, formed by the projections O' from the end cross bars. The brake bars are held normally away from the wheels by coiled springs located between the bars and the ends of the guideways as shown at $o^2$. Parallel with each bar O, is a supplemental bar P, which is provided with bearing blocks $p$, which prevent the near approach of the supplemental bar to the brake bar. These supplemental rods are connected by the rods P', which connect their outer ends, so that the movement of one in one direction must necessarily draw the other in the same direction. For operating these supplemental bars and the brake bars an eccentric is provided as at Q, which is journaled in a sliding bearing or in a slot in a plate $q$ projecting from the cross bar, and the edges of this eccentric bear against the brake bar upon one side and against the supplemental bar on the other, these bars being slightly grooved to receive the periphery of the eccentric.

Suitable means are provided for rotating the eccentric, such as a lever Q' through which connections may be made to the ordinary brake lever or wheel. The rotation of the eccentric at one end of the truck will cause the brake bar and supplemental bar at that end to be forced apart, and as the bearing blocks prevent the near approach of the brake and supplemental bars at the other end, the brake bars with their shoes at each end will thus be forced into contact with the wheels, applying the brakes. The reverse movement of the eccentric will allow the springs to force the brakes away from the wheels.

I claim as my invention—

1. In a car truck a frame comprising the side bars composed of two sections with a space between, the cross-bars connecting the side bars and supporting the brake mechanism, springs located centrally of the frame, sills located above the side bars, and levers pivoted between the sections of the bars having their outer ends connected with the ends of the sills and their inner ends with the springs, substantially as described.

2. In a car truck a frame comprising the side bars with cross bars connecting the same, springs located in openings in the center of the side bars, sills mounted above the side bars, and levers pivoted in the side bars having their inner ends connected to the springs and their outer ends to the ends of the sills, substantially as described.

3. In a car truck a frame comprising the side bars composed of two sections with a space between, springs located in openings in the center of the side bars, levers pivoted between the sections having their inner ends connected to the springs, sills located above the side bars having their ends resting upon the outer ends of the levers, and projections extending from the lower face of the sills between the sections, substantially as described.

In testimony whereof I affix my signature in presence of two witnesses.

JAMES L. HARDIE.

Witnesses:
J. N. SHANAFELT,
JOHN LEARY.